United States Patent

[11] 3,610,759

[72] Inventor Lowell L. Wood, Jr.
 Simi, Calif.
[21] Appl. No. 645,913
[22] Filed June 14, 1967
[45] Patented Oct. 5, 1971
[73] Assignee Mercantile-Safe Deposit and Trust Company

[54] METHOD AND APPARATUS FOR ANALYZING ATOMIC SPECTRA OF GAS SAMPLES
 16 Claims, 2 Drawing Figs.

[52] U.S. Cl. .................................................... 356/85,
  313/111, 315/231, 356/98
[51] Int. Cl. ........................................................ G01j 3/34
[50] Field of Search ............................................ 356/36, 85,
  86, 87, 244, 246; 313/153, 160, 161, 231;
  315/108–111; 331/94.5

[56] References Cited
UNITED STATES PATENTS

| | | | |
|---|---|---|---|
| 3,464,025 | 8/1969 | Bell .............................. | 331/94.5 |
| 2,991,684 | 7/1961 | Wever et al. .................. | 356/36 |
| 3,105,803 | 10/1963 | Weibel ......................... | 313/161 X |
| 3,424,533 | 1/1969 | Hughes et al. ................ | 356/85 |

OTHER REFERENCES

Freiberg et al.: " Effects of Lasering upon the Electron Gas and Excited-State Populations in Xenon Discharges," Journal of Applied Physics, volume 38, No. 1, January 1967, pages 250– 262.

Bell: Applied Physics Letters, vol. 7, no. 7, Oct. 1, 1965, pages 190, 191

McCormack et al.: Analytical Chemistry, vol. 37, no. 12 November 1965, pages 1470– 1476.

Paananen: IEEE Spectrum, June 1966 pages 88, Oct. 1966,

Bloom: Applied Optics, volume 5, no. 10, Oct. 1966, pages 1500, 1510, 1511 relied on.

*Primary Examiner*—Ronald L. Wibert
*Assistant Examiner*—F. L. Evans
*Attorney*—Cushman, Darby & Cushman ABSTRACT: An elemental gas analyzer wherein the gas is converted into a highly ionized and dense plasma in which the molecules are completely disassociated into their respective atoms. The plasma is created by a magnetically coupled source of radio frequency energy and the resulting atomic spectral emission lines are monitored by a plural channel spectrographic detector for providing an indication of the concentration of each of the atoms present in the plasma from which the quality and quantity of gas may be accurately determined.

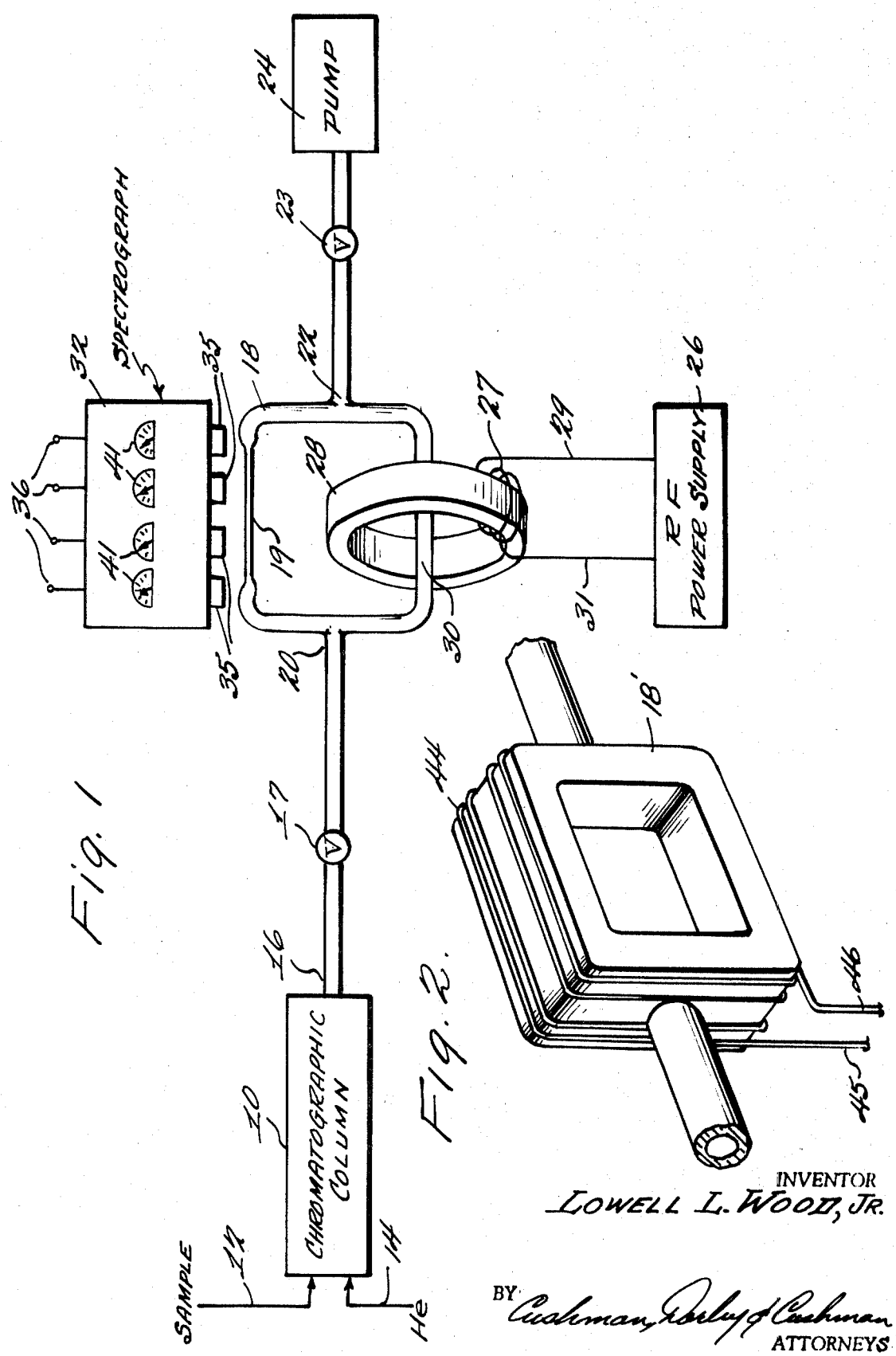

METHOD AND APPARATUS FOR ANALYZING ATOMIC SPECTRA OF GAS SAMPLES

The present invention relates to a method and apparatus for qualitative and quantitative gas analysis and more specifically, concerns the use of the spectrographic method of gas analysis.

In the field of gas chromatography, as well as many other areas, the need for extremely sensitive and accurate methods and apparatus for the qualitative and quantitative analysis of minute quantities or traces of gases is strongly felt. The present invention provides such a highly sensitive and accurate elemental trace gas analyzer which is particularly well suited for use as a detector cell for a gas chromatography apparatus. The present invention is also particularly useful in many other applications in gas analysis.

In gas chromatography a sample of a mixture of gases which is to be analyzed is injected into a chromatographic column along with a carrier gas. In accordance with the well-known principle of gas chromatography, the relative velocity of each of the constituents of the mixture through the column is different which therefore results in a time-spaced output of each of the gaseous components of the mixture injected into the column. The quantity of the sample originally injected into the column is often quite small, and consequently, the quantity of the constituent components of the gases outputted from the chromatographic column is also quite small. In order to determine both the quality and quantity of each of the constituents, therefore, extremely sensitive detectors are required.

The present invention provides such a method and apparatus and comprises the use of a discharge tube in the shape of a toroid having an input port, adapted to receive the output from the chromatographic column, and an output port. Various valve means and pumps are provided to regulate the flow of the gaseous constituents through the discharge tube and the pressure maintained therein. A source of radio frequency electrical energy is magnetically coupled to the discharge tube and is of such a frequency to create a dense plasma discharge in the gas located within the discharge tube. The radio frequency may be continuous or pulsed. The magnetic coupling may be effected directly or through a doughnut shaped or toroidal core of high-permeability material, having a primary winding which is energized by the radio frequency source. One leg of the discharge tube is disposed within the core whereby the loop configuration of the discharge tube functions in the nature of a secondary winding of a transformer.

As mentioned, the radio frequency energy may also be directly coupled to the discharge tube. Direct coupling may be effected by disposing a coil about the toroidal shaped discharge tube, the plane of the coil being coincident with that of the discharge tube. In this manner the magnetic field generated by the coil passes directly through the discharge tube to excite the gases therein to the point whereat the high-density plasma discharges will occur.

It has been found that within a particular range of radio frequencies, a high-intensity ring discharge is created within the discharge tube. This ring discharge is concentric with the discharge tube and is effective to create an extremely dense plasma current around the toroidal shaped discharge tube. Such a high-current discharge has been found to completely tear apart, or disassociate, the molecules of the gas present in the tube into its respective atomic elements. The ring discharge and the plasma created thereby also impart sufficient energy to the various atoms and ions of the disassociated molecules to cause the characteristic radiative emissions therefrom to the exclusion of any molecular band emissions. Thus the spectra of emissions will comprise the line emissions of the atoms and atomic ions of the molecules present in the gas and will be proportional to the number of those atoms present.

The present invention further provides a plurality of radiation sensitive detectors, each of which is sensitive to a different characteristic wavelength of the atoms contained in the various constituents of the sample gas. In this manner, by determining the absolute magnitude as well as the relative magnitudes of the various atomic emissions generated in the discharge tube, it is possible not only to determine the empirical formula of the particular gas located within the tube at any given time, but also the quantity of such gas. However, when the composition of the quantity of the gas is not changing rapidly a scanning spectrometer could be employed.

The use of the ring discharge to produce a substantially completely disassociated plasma enables the monitoring of the atomic emissions lines to the exclusion of the molecular bands whereby the accuracy of the system approaches that of presently known wet chemistry methods for empirical formula determination. Thus it can be seen that the present invention provides a extremely sensitive and accurate analytical tool in which the nature and quantity of minute traces of a gas can be precisely determined.

The present invention may be better understood by reference to the following detailed description along with the accompanying drawings wherein:

FIG. 1 is a diagrammatic illustration of a preferred embodiment of the present invention; and FIG. 2 is another embodiment wherein the radio frequency energy is directly coupled to the discharge tube.

With reference to FIG. 1, there is diagrammatically illustrated at 10 a conventional gas or vapor phase chromatographic column, the specific structure of which is well known in the art, and forms no part of the present invention and, therefore, will not be described in detail herein.

The method of gas or vapor phase chromatography has been found particularly useful in the separation and analysis of mixtures of organic vapors and therefore the present invention will be described with reference thereto, however, it is to be understood that the present invention is equally well suited for use with inorganic mixtures. A sample of a mixture of organic vapors which is to be analyzed is injected into the column at 12 along with a carrier gas which is injected at 14. In accordance with the well-known principles of gas chromatography, each constituent of the sample mixture passes through the column at a different velocity which thereby results in a time-spaced output at 16 or each of the constituents.

The constituent gases are passed through a one-way needle valve 17 and into the toroid shaped quartz discharge tube 18 through input port 20. In practice the tube 18 may be other than quartz. The limiting factors to be considered are the heat resistivity and transparency. The discharge tube should be transparent to wavelengths of interest in order to pass the relevant atomic emissions. The gas then passes from the discharge tube 18 through output port 22 through needle valve 23 to a pump 24. Needle valves 17 and 23 are conventional valve structures and are employed herein to regulate the flow of gas through the discharge tube and in conjunction with pump 24 which may be any suitable mechanical vacuum pump serve to maintain the flow of gas through the apparatus and create a pressure within the discharge tube between 0.1 mm.(Hg) and 1 atmosphere. In accordance with a preferred embodiment the pressure is maintained between 1 mm. and 3 cm. of mercury.

Radio frequency power supply 26 is connected by leads 29 and 31 to coil 27 which functions a a primary winding on the toroidal shaped core 28. Core 28 is preferably comprised of a high-permeability material such as a ferrite for optimum magnetic coupling of the radio frequency energy to the discharge tube 18 which passes through the core at 30.

The RF magnetic field is effective to create a high-intensity ring type discharge in the gas located within the quartz tube when the frequency of the excitation field is between 1 and 50 megahertz. At these frequencies the free electrons of the gas acquire sufficient energy to cause a cumulative ionization process whereby the gas breaks down into a luminous discharge in the form of ring concentric with the surface of the discharge tube. Due to the disposition of the discharge tube 18 within and about the core 28 the positive and negative ions (plasma) created by the discharge, are caused to flow around the discharge tube as an electric or plasma current due to the transformer effect created by the "primary" winding 27 and the core 28.

This current has been found to be quite dense, on the order of $10^3$ amps-cm.[12], which creates sufficiently hot plasma to tear apart the molecules of the gas into their various atoms. Of course the energy is also sufficient to cause the characteristic radiative emission of the atoms which may be measured. The spectrographic apparatus 32 is a multichannel device having a plurality of radiation sensitive detectors 35 for monitoring selected spectral emissions from the atomic plasma in the discharge tube. It is to be understood that the radiation from the entire discharge tube need not be monitored and that the radiation from only preselected regions of the tube, whereat the current density is a maximum, may be selected in order to insure the absence of molecular bands. In actual practice a portion of the discharge tube may have a reduced diameter to increase the current density at that point such as that shown in 19.

Each of the detectors, which may be photocells or other suitable devices sensitive to electromagnetic radiation, are selected to be sensitive to different discrete wavelengths of radiation which correspond to a characteristic wavelength of spectral emission from the atoms contained in the gas which is under analysis. Any number of radiation sensitive elements may be employed although only four are shown in the figure.

A plurality of indicators such as meter dials 41 are provided and are responsive to the output of the detectors 35. These dials provide a visual readout of the intensity of the particular wavelength to which the particular detector with which it is associated is responsive. Output terminals 36 may be employed to provide an output which may be processed by a computer or recorded by any well-known apparatus.

In operation of the device described hereinbefore it can be seen that should a sample of a mixture of organic gases be introduced to chromatographic column at 12 along with the carrier gas the output at 16 will be a continuous flow of helium and a time-spaced output of the various components of organic mixture.

The helium carrier gas, along with the first element of the organic mixture to pass through column 10 will be fed to the discharge tube 18 where the radio frequency energy, coupled magnetically to the tube 18 by core 28 (FIG. 1) or winding 44 (FIG. 2) will generate a high-intensity ring discharge in the gas which in turn results in a very dense plasma current flow around the tube 18. The high-electron temperature generated by this dense plasma, coupled with the ring discharge, is effective to completely disassociate the molecules of the gas into their elemental atomic constituents which results in the emission of atomic spectral lines to the exclusion of the molecular bands, the intensity of their emissions being proportional to total concentration of the particular atoms.

By detecting the carbon, hydrogen, nitrogen and oxygen emission wavelengths, which are the basic components of organic vapors, the basic empirical formula of the gas can be determined by reference to the relative magnitudes of these emissions and the total concentration of the gas can be determined from the absolute magnitude of these emissions. It will of course, be apparent that the device may be made even more precise by adding additional radiation sensitive detectors responsive, say, to the halogen emission wavelengths in order to distinguish the particular halogen present.

The helium carrier gas is particularly useful in the present invention due to its relatively high excitation potential with respect to the excitation potential of the gases under test, which renders the intensity of the test gas emissions much higher than the helium emissions. This fact allows detection of the emission spectra with minimum interference from the carrier gas. Of course the present invention contemplates the use of any other suitable carrier gas.

The direct magnetic coupling of the radio frequency energy as shown in FIG. 2 comprises a winding 44 directly wound about the toroidal discharge tube in such a manner that the plane of the coil coincides with the plane of the discharge tube. The terminals 45 and 46 are adapted to be connected to the radio frequency source whereby the magnetic field generated within the coil will cause the high-intensity ring discharge in the manner described hereinbefore with respect to FIG. 1.

From the foregoing description it will be apparent to those of ordinary skill in the art that the present invention is amenable to various changes and modifications, as well as to uses other than those particularly disclosed and described herein.

It is to be understood, therefore, that the scope of the present invention is not intended to be limited by the foregoing description of a preferred embodiment of the invention but on the contrary is to be determined only by reference to the following claims.

What is claimed is:

1. The method of qualitatively and quantitatively analyzing a gas, said method comprising the steps of:
   a. flowing a sample of the gas to be analyzed into a conduit,
   b. exciting said gas with a magnetically coupled source of radio frequency energy to a point whereat the molecules in at least a region thereof become substantially completely disassociated,
   c. detecting the intensity of a plurality of spectral emissions from a plurality of different types of the atoms in said region caused by said radio frequency excitation, and
   d. measuring the relative intensities of said spectral emissions for use in determining an empirical formula for said sample.

2. The method of claim 1 wherein said radio frequency energy has a frequency in the range of 1–50 megahertz.

3. The method of claim 1 wherein a carrier gas, for sustaining the discharge, is injected into said conduit along with said sample gas, said carrier gas having a relatively high excitation potential with respect to the excitation potential of said sample gas.

4. The method of claim 3 wherein said carrier is gas helium.

5. The method of quantitatively and qualitatively analyzing a gas, said method comprising the steps of:
   a. flowing a sample of the gas into a toroidal shaped conduit, at least a portion of which is transparent,
   b. creating a high-intensity ring discharge in said gas to produce a dense plasma current wherein the molecules of said gas are substantially completely disassociated,
   c. monitoring the intensity of a plurality of atomic spectral emission lines produced by said plasma from a plurality of different types of atoms, and
   d. determining an empirical formula for the gas being analyzed from the relative intensities of the atomic and ionic spectral emissions.

6. The method of claim 5 further comprising the step of maintaining the pressure within said conduit at a value in the range of 0.1 mm.(Hg) to 1 atmosphere.

7. An apparatus for gas analysis comprising:
   a conduit, said conduit having an input port for receiving a sample of gas to be analyzed and an output port,
   means for flowing a sample of gas to be analyzed into said conduit,
   a source of radio frequency energy,
   means for magnetically coupling said source of radio frequency energy to said conduit for generating high-intensity ring discharge in said gas so that the molecules in at least a region thereof become substantially completely disassociated, and
   means for detecting the relative intensities of a plurality of atomic and ionic spectral emissions from a plurality of different types of atoms in said region thereby permitting determination of an empirical formula for said gas.

8. The apparatus of claim 7 wherein said conduit is formed in a closed loop having said input port at one side thereof and said output port at the other side thereof, said magnetically coupled radio frequency energy thereby being effective to generate a high-intensity current flow around said closed loop.

9. The apparatus of claim 7 wherein said means for magnetically coupling said radio frequency energy to said conduit and comprising:
   a toroid of high-permeability material disposed about said conduit,
   a coil wound about said toroid, and
   means for connecting said source of radio frequency energy to said coil.

10. The apparatus of claim 7 wherein said means for detecting the spectral emissions comprises:
   a plural channel spectrographic detector having a corresponding plurality of radiation sensitive elements, each of said elements being responsive to a different and discrete wavelength of the radiations emitted by the atoms of the gas to be analyzed.

11. The apparatus of claim 10 further comprising readout means associated with each of said plural channels of said spectrographic detector for providing an indication of the empirical formula of the gas being analyzed.

12. The apparatus of claim 7 wherein the frequency of said radio frequency source is between 1 and 50 megahertz.

13. The apparatus of claim 8 wherein said high-intensity ring discharge produces a current density on the order of $10^3$ amps-cm.$^{12}$.

14. The apparatus of claim 7 further including means for injecting a carrier gas into said conduit along with the gas to be analyzed for sustaining said ring discharge, said carrier gas having a relatively high excitation potential with respect to the excitation potential of the gas to be analyzed.

15. The apparatus of claim 14 wherein said carrier gas is helium.

16. The apparatus of claim 7 further comprising means for maintaining the pressure within said conduit as a value in the range of 0.1 mm.(Hg) to 1 atmosphere.